United States Patent [19]

Ojima

[11] Patent Number: 5,073,158
[45] Date of Patent: Dec. 17, 1991

[54] BELT OR CHAIN TENSIONER FOR POWER TRANSMITTING SYSTEM

[75] Inventor: Juji Ojima, Aikawa, Japan

[73] Assignee: NHK Spring Co., Ltd., Yokohama, Japan

[21] Appl. No.: 561,078

[22] Filed: Aug. 1, 1990

[30] Foreign Application Priority Data

Aug. 1, 1989 [JP] Japan .................................. 1-199802

[51] Int. Cl.⁵ .............................................. F16H 7/08
[52] U.S. Cl. ..................................... 474/138; 474/111
[58] Field of Search ....................... 474/101, 109–111, 474/113–117, 133, 135, 136, 138

[56] References Cited

U.S. PATENT DOCUMENTS 4,902,266 2/1990 Ojima et al. ...................... 474/111

FOREIGN PATENT DOCUMENTS 0035594 5/1961 Switzerland ...................... 474/138

Primary Examiner—Thuy M. Bui
Attorney, Agent, or Firm—Fleit, Jacobson, Cohn, Price, Holman & Stern

[57] ABSTRACT

A belt or chain tensioner comprising a tube type casing provided with a plurality of through holes, wherein a sleeve, a cup type tension rod and a compression spring are mounted from the rear end of casing and detachably supported by a plug screwed in the casing so as to permit the urging tension rod to be locked at various stages of extension.

6 Claims, 2 Drawing Sheets

BELT OR CHAIN TENSIONER FOR POWER TRANSMITTING SYSTEM

BACKGROUND OF THE INVENTION

The present invention relates to a tensioner for tensioning belt or chain for internal combustion engines.

A tensioner is used to apply a constant tension on a belt o chain, directly or indirectly by means of a pulley or the like. A basic construction is such that a tension rod urged by a compression spring is mounted slidably in a casing. In this type of tensioner, it is possible that the tension rod may be urged so excessively that it will fly out of the casing accidentally. Therefore, the tensioner is provided with a stopper pin for locking the tension rod when not in use. A conventional stopper pin is inserted in a small hole formed on the casing and the tension rod for locking the tension rod when not in use. After fixing the tensioner on equipment, the stopper pin is taken off so as to unlock the tension rod.

However, in this type of locking system, it is necessary to position holes on the casing and the tension rod, and that positioning is very hard, because of only one locking position on the whole stroke of tension rod, not permitting locking in any place.

Therefore, a locking system has been disclosed by a Japanese Patent Application wherein an extension on the rear end of tension rod is used for positioning. As shown in FIG. 7, a tension rod 201 is slidably supported by a bearing 202a, of which tail portion 201a is used so as to form a pluraltiy of through holes 203 in it. Numberal 205 indicates a compression spring for urging the tension rod 201.

The tension rod 201 can be locked in various positions by a stopper pin 204 inserted in the through holes 203 on the tail portion 201a so that the tension rod may stay in necessary position for storage and maintenance.

Consequently, the dimensional size of this type of tensioner 200 became excessively large because tail portion 201a extended from the rear end of casing 202, resulting in difficult installation in limited space and causing an increase of weight.

The present invention was developed considering the above situations and is to provide a light and compact tensioner having a locking system in various positions.

SUMMARY OF THE INVENTION

In order to solve the above problems, an embodiment according to the present invention is provided with following structure: A tensioner for tensioning a belt or chain by urging a tension rod characterized by comprising a cup type tension rod with a flange portion of larger diameter, a casing of cylindrical form with an end plug screwed in for bearing said tension rod slidably and with a plurality of independent through holes for locking the tension rod by inserting a stopper pin onto the flange portion of the tension rod and a compressiong spring mounted between the end plug of the casing and the bottom of the tension rod for urging the tension rod.

EMBODIMENT

Figure 1:
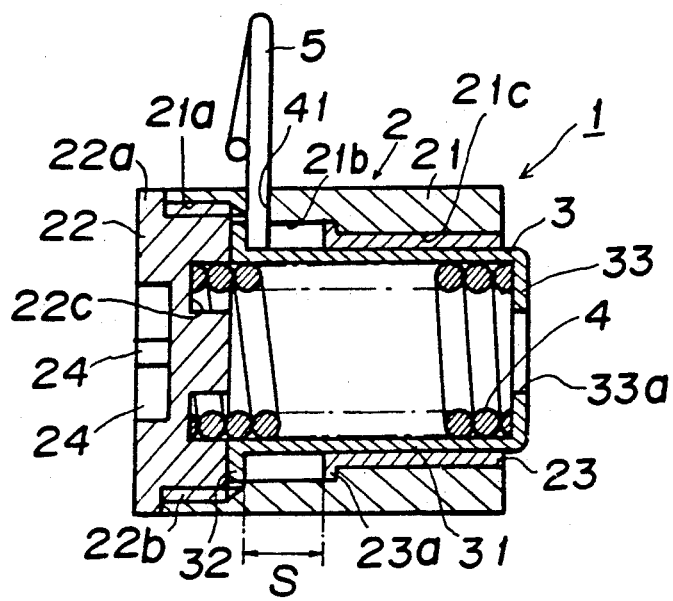
FIG. 1 shows a vertical section of an embodiment according to the present invention.
Figure 3:
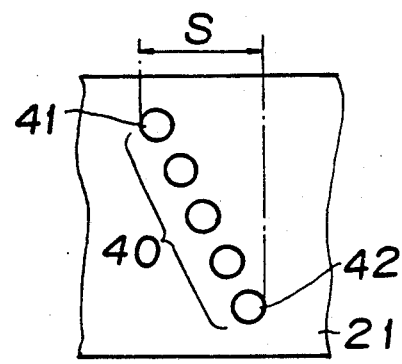
FIG. 3 shows a partial development view of a casing wherein a plurality of independent through hole are formed diagonally on the casing.

Hereinafter, an embodiment according to the present invention will be explained with reference to the drawings. In FIG. 1, a tensioner mainly comprises a casing 2, a tension rod 3 urging from the casing for tensioning a chain or belt, a compression spring 4 for driving the tension rod 3 and a stopper pin 5 for locking the tension pin 3.

The casing comprises a cylindrical portion 21 for slidably bearing the tension rod 3, an end plug 22 screwed in the rear end of cylindrical portion 21 of casing 2.

There are three inner diameter portions of the casing, large diameter portion 21a, medium diameter portion 21b and small diameter portion 21c starting from the rear to the front. The inner wall of the large diameter portion 21a is threaded. A sleeve 23 of samll diameter with flange 23a of medium diameter is fit in the small diameter portion 21c and medium diameter portion 21b respectively. The sleeve 23 is made of, for example, synthetic materials and pressed in the small diameter portion 21c of the casing 2.

The end plug 22 has a flange portion 22a and the outer surface of end plug 22 is threaded as indicated at 22b. A recessed portion 24 is formed for a tool on the surface of the flange portion 22a and a ring groove 22c is formed on the surface of the end plug 22 so as to be screwed in the inner thread 21a of large diameter portion of casing by using tool.

The cup type tension rod comprises a cylindrical portion 31 having an outer diameter a little smaller than the inner diameter of the sleeve 23, a flange portion 32 formed on the open end of the tension rod 3 and a bottom 33 with a through hole 33a. The through hole 33a is a vent for air and is not indispensable.

The outer diameter of the flange portion 32 is a little smaller than the medium diameter portion 21b of the cylindrical portion of casing.

The tension rod 3 is mounted slidably in the sleeve 23 so that the flange 32 slides freely in the medium diameter portion 21b of the casing.

A compression spring 4 is mounted between the ring groove 22c of the end plug 22 and the bottom 33 of the tension rod 31.

The outer diameter of the compression spring 4 is almost equal to the inner diameter of the cylindrical portion 31 of the tension rod 3 so as to cause friction between the spring 4 and the inner wall when the tension rod slides in.

The stopper pin 5 is inserted into the space formed by the medium diameter portion 21b and the tension rod through an independent through hole 41 of a plurality of through holes 40, the stopper pin 5 abuts on the flange portion 32 of the tension rod 3 so as to lock the tension rod urged by the compression spring 4.

In this case, a plurality of through holes 40 are formed at different positions within the stroke of the tension rod. The maximum stroke is equal to the distance between the flange 32 of the tension rod 3 and the flange 23a of the sleeve 23.

A plurality of through holes 40 comprising 5 through holes are formed between the through hole 41 and the through hole 42 at even distances, wherein the through hole 41 is a hole for locking the tension rod 3 in the most retracted position and the other through hole 42 is a hole for locking the tension rod 3 in the most advanced position. Accordingly the tesnion rod 3 can be locked in five positions within the stroke S.

A belt or chain tensioner 1 having the above construction functions as follows:

The tension rod 3 can be locked in the most retracted position by inserting the stopper pin 5 into through hole 41 after assembling the tensioner 1 as shown in the FIG. 1. The tensioner can be mounted on an engine wall or equivalent by screwing through fixing holes 25a abutting the head 33 of tension rod 3 on a belt or chain not shown.

Then the tension rod can be released by taking off the stopper pin 5 and the tension rod is urged from the casing by the compression spring 4. In this manner, an adequate tension can be applied on a belt or chain directly or indirectly through certain shoe not illustrated. When resonance occurs due to the counterforce of a chin or belt, the resonance can be alleviated by a friction between the tension rod 3 and the compression spring 4.

When it is necessary to do some maintenance service on the tensioner 1, the tension rod 3 can be locked in normal working position by inserting the stopper pin 5 into a certain through hole. Then the compression spring 4 does not work and the tensioner 1 can be taken off easily for repair work.

Figure 4:
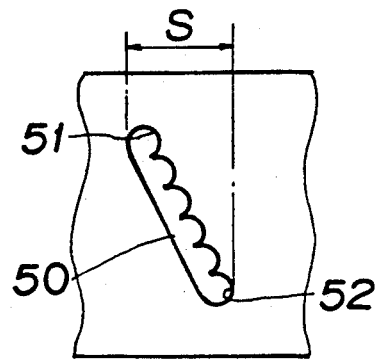
FIG. 4 shows a partial plan view of a casing wherein a plurality of connected through holes are formed diagonally.

FIG. 4 shows a variation of group holes 50 which the stopper pin 5 is inserted into, where five holes 50 are partially connected, but work independently. In this case, the position of flange portion 32 can be located visually through the connected through holes. Therefore it is easy to insert the stopper pin 5 in any desired position.

Figure 5A:
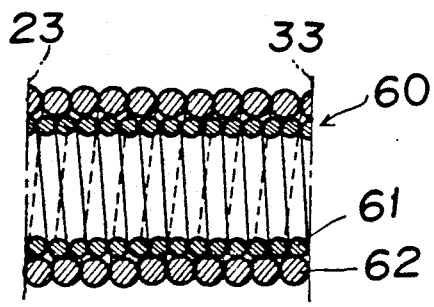
FIG. 5 (a) shows a lateral sectional view of a double compression spring, 5 (b) shows a lateral view of a stranded wire material for a spring and 5 (c) shows a sectional view of a compression spring having a nonlinear characteristic.
Figure 5B:
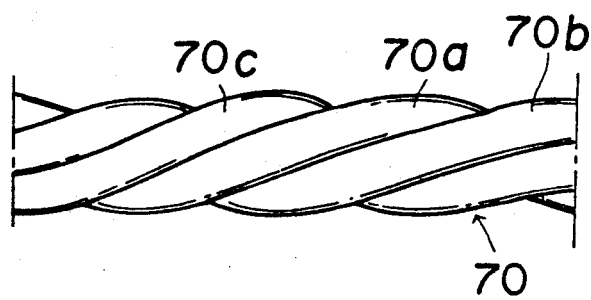
Figure 5C:
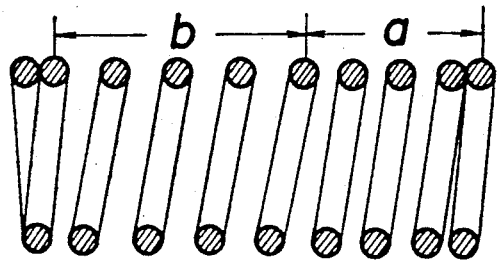

FIG. 5 shows a variation of a compression spring for urging the tension rod 3.

FIG. 5 (a) illustrates a sectional view of a multiple spring 60 comprising an inner compression spring 61 and an outer comprsesion spring 62 both wound closely to each other in opposite directions. When the multiple compression spring 60 is used in the place of the compression spring 4 in the tensioner 1, a possible resonance due to counterforce of a chain or belt can be effectively alleviated. FIG. 5 (b) shows a stranded wire 70 for winding compression spring. The stranded wire 70 comprising three wire elements, 70a, 70b and 70c.

When this type of compression spring made of stranded wire is used in the place of compression spring 4, the resonance due to excessive vibration of belt or chain can be effectively alleviated by the friction between wire elements 70a, 70b and 70c.

FIG. (c) shows a compression spring 80 of nonlinear characteristic, which comprises two different pitch portions, a small pitch portion (a) and a large pitch portion (b). When it is used in he place of compression spring 4, the effective turn of the spring varies at resonance and accordingly the natural frequency varies alleviating the resonance.

Figure 2:
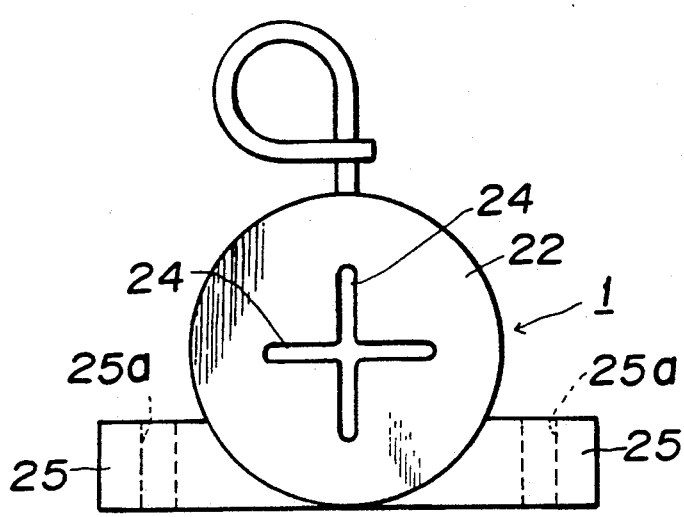
FIG. 2 shows a rear view
Figure 6:
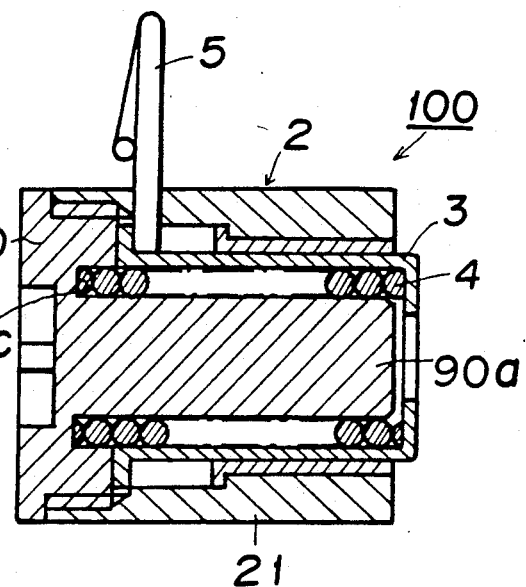
FIG. 6 shows a lateral view of another embodiment.
Figure 7:
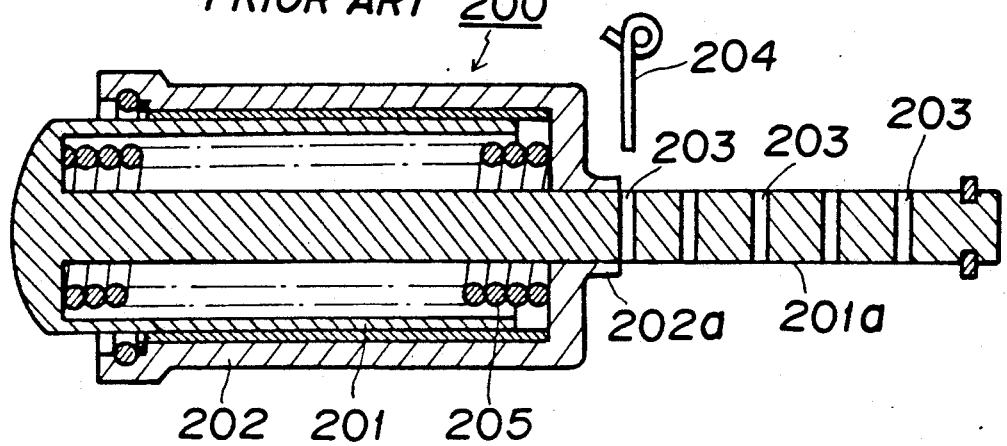
FIG. 7 shows a vertical sectional view of a conventional tensioner.

FIG. 6 shows another variation of the casing. In the tensioner 100, a plug 90 corresponding to the plug 22 is used and other parts are identical to those of the tensioner 1 shown in the FIG. 1 and 2. The plug has a rear cylindrical portion 90a which works as a core for the compression spring 4.

The rear cylindrical portion 90a has a outer diameter corresponding to the inner diameter of the compression spring 4 and a dimensional length almost equal to the axial length of the casing 21. And the compression spring 4 is inserted externally on it.

In this type of tensioner 100, the resonance due to the excessive vibration of a belt or chain can be alleviated effectively by a friction between the compression spring 4, the tension rod 3 and the cylindrical portion 90a.

A plurality of through holes are formed on the casing at determined distances within the stroke of the tension rod into which the stopper pin is inserted so as to lock the tension rod in one of a plurality of positions, dispensing with he need for any additional component for locking the tension rod. Accordingly, it is possible to provide a light and compact tensioner which is easy to dimount because the tension rod can be locked firmly in a desired working position.

A plurality of through holes are formed continuously on the casing. Therefore it is possible to select any through hole within the whole stroke for locking still visually.

The compression spring for urging the tension rod is inserted in the tension rod with friction, by which the resonance of the tensioner can be prevented. Also the resonance of the tesnioner can be alleviated by using a compression spring of nonlinear characteristic, a compression spring made of stranded wire or a muliple compression string.

In addition, the resonance of the tensioner can be alleviated by using the cylindrical portion inserted in the compression spring with friction.

The locking operation can be easily executed by using the stopper pin inserted through the casing onto the flange portion formed on the rear end of the tension rod. Also the locking position can be changed by visually selecting through holes formed on the casing in various and continuous positions.

What is claimed is:

1. A tensioner for tensioning a belt or chain by urging a tension rod from a casing by means of a compression spring comprising:

a tube type casing slidably supporting a tension rod, said casing having a plurality of through holes formed therein, and a stopper pin insertable into said through hols so as to hold said tension rod at a predetermined urging position within the stroke of the tension rod;

a sleeve made of synthetic resin having a flange portion on a rear end thereof inserted in a small diameter portion of said casing;

a plug detachably screwed in the rear end of said casing for supporting a rear end of a compression spring for urging said tension rod;

a cup shaped tension rod having a head portion and a flange portion on a rear end thereof inserted slidably in said casing and supported by said plug; and a compression spring mounted in said tension rod so as to urge said tension rod, the rear end of said compression spring being supported by said plug.

2. The tensioner according to claim 1, wherein said compression spring is of nonlinear characteristic.

3. The tensioner according to claim 1, wherein said compression spring is made of stranded wire.

4. The tensioner according to claim 1, wherein said compression spring is a multiple compression spring.

5. The tensioner according to claim 1, wherein said plug comprises a cylindrical core portion extending from its rear end to an open end of said casing for externally inserting said compression spring.

6. The tensioner according to claim 1, wherein the plurality of through holes are continuously formed in said casing within the stroke of tension rod.

* * * * *